(No Model.) 2 Sheets—Sheet 1.

B. H. KEMBLE.
AXLE JOURNAL AND BOX.

No. 453,839. Patented June 9, 1891.

WITNESSES:
A. P. Grantz
W. F. Kircher

INVENTOR:
Bushrod H. Kemble
BY Wiedersheim & Kintner
ATTORNEYS.

(No Model.) 2 Sheets—Sheet 2.

B. H. KEMBLE.
AXLE JOURNAL AND BOX.

No. 453,839. Patented June 9, 1891.

WITNESSES:
Th. Rollé
A. P. Jennings.

INVENTOR:
Bushrod H. Kemble
BY Diederheim & Kirtner
ATTORNEYS.

UNITED STATES PATENT OFFICE.

BUSHROD H. KEMBLE, OF CAMDEN, NEW JERSEY.

AXLE JOURNAL AND BOX.

SPECIFICATION forming part of Letters Patent No. 453,839, dated June 9, 1891.

Application filed January 11, 1888. Renewed January 24, 1891. Serial No. 379,350. (No model.)

*To all whom it may concern:*

Be it known that I, BUSHROD H. KEMBLE, a citizen of the United States, formerly residing in the city and county of Philadelphia, State of Pennsylvania, now residing in the city and county of Camden, State of New Jersey, have invented new and useful Improvements in Axles and Axle-Boxes, which improvements are fully set forth in the following specification and accompanying drawings.

My invention relates to improvements in axles and axle-boxes; and it consists in an axle or axle-box provided with anti-friction rollers and having means, substantially as described and claimed, for retaining said rollers in position, as will be hereinafter fully set forth, and pointed out in the claims.

Figure 4:
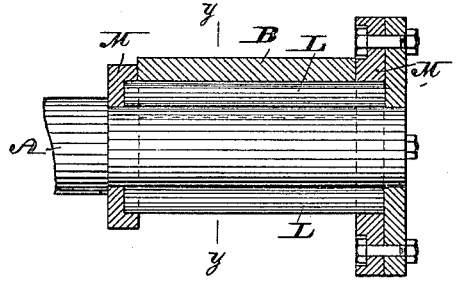
Figure 5:
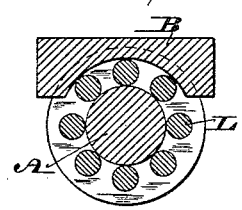
Figure 6:
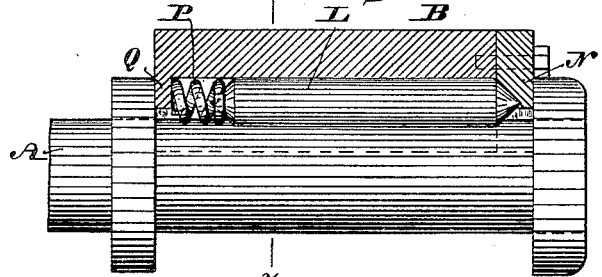
Figure 7:
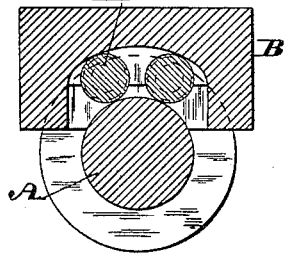

Figure 1 represents a longitudinal section of an axle and box or journal embodying my invention. Fig. 2 represents a side elevation of the lubricator detached. Fig. 3 represents a section on line $x$ $x$, Fig. 1. Figs. 4 and 6 represent longitudinal sections of modifications. Fig. 5 represents a section on line $y$ $y$, Fig. 4. Fig. 7 represents a section on line $z$ $z$.

Similar letters of reference indicate corresponding parts in the several figures.

Referring to the drawings, A represents an axle, which in Fig. 1 is that of a vehicle, and B represents the box rotatable thereon. In the axle is a duct D, which extends radially and opens at the periphery of the axle, its inner end being in communication with the bore C of the neck E of an oil-cup F, said neck being threaded and screwed into the axle, whereby the box is at the outer end of the axle and outside of the said cup also acting as the nut of the axle. The cup is provided with a screw or cap G for closing the opening by which the cup is supplied with the lubricant. Interposed between the cup and adjacent end of the box is a spring-washer H, which takes up lost motion and keeps the box in position. In the duct D is a valve J, which opens and closes, due to vibrations or shaking of the axle or box, thus preventing rapid discharge of the oil or lubricant, it being seen that the oil or lubricant from the cup passes through the bore C, enters the duct D, and escapes at the longitudinally-extending groove K on the periphery of the axle A, and is thus distributed along the inner periphery of the box B, thus properly lubricating the same.

L represents a roller, which is let into the periphery of the axle and rests freely in a recess therein, so as to come in contact with the box B, so as to rotate by such contact. By this provision the friction between the axle and box is reduced and the box rotates with ease around said axle.

In Figs. 4 and 5 the rollers L are mounted on a flange M of the axle or journal A, the latter being rotatable and the box or bearing B stationary, the result, however, being the same as in Fig. 1. In Figs. 4 and 5 several rollers are shown, and in Figs. 1 and 3 but one roller is shown; but in the latter case the number may be increased, as illustrated by the dotted lines, Fig. 3. In Figs. 6 and 7 the rollers are shown as mounted on the face of the box or bearing B, and the axle or journal A is rotatable in contact with said rollers, whereby said axle or journal rotates with ease, owing to the reduced friction of the parts.

In order to secure a roller in position and admit of the removal of the same in a novel and convenient manner, (see Fig. 6,) I have one end of the roller seated in the wall N of the box B and the other end pressed by the spring P, resting against the opposite wall Q, so that the roller is nicely held in position, the roller being shorter than the recess in which it is located. When the box is removed and the roller forced against the spring until it clears its seat in the wall, it may be readily displaced and afterward reapplied. The spring is shown in dotted lines, Fig. 1.

Having thus described my invention, what I claim as new, and desire to secure by Letters Patent, is—

1. The combination of an axle or bearing, a rotatable box mounted thereon, an interposing roller between said axle and box, and a spring bearing against one end of the roller, substantially as described.

2. An axle or bearing having a removable friction-roller, which is seated at one end in the wall of the axle or bearing and held by a spring at the other end.

B. H. KEMBLE.

Witnesses:
JOHN A. WIEDERSHEIM,
A. P. JENNINGS.